United States Patent
Park

(10) Patent No.: US 9,546,885 B2
(45) Date of Patent: Jan. 17, 2017

(54) ENCODER ALIGNING APPARATUS

(71) Applicant: SOONHAN ENGINEERING CORP., Seongnam, Gyeonggi-do (KR)

(72) Inventor: Yon Mook Park, Seongnam (KR)

(73) Assignee: SOONHAN ENGINEERING CORP., Seongnam (KR)

(*) Notice: Subject to any disclaimer, the term of this patent is extended or adjusted under 35 U.S.C. 154(b) by 84 days.

(21) Appl. No.: 14/713,491

(22) Filed: May 15, 2015

(65) Prior Publication Data

US 2015/0338247 A1     Nov. 26, 2015

(30) Foreign Application Priority Data

May 26, 2014   (KR) .................. 10-2014-0062937

(51) Int. Cl.
   *G01D 5/244*   (2006.01)
   *G01D 5/347*   (2006.01)

(52) U.S. Cl.
   CPC ...... *G01D 5/24452* (2013.01); *G01D 5/24433* (2013.01); *G01D 5/34707* (2013.01)

(58) Field of Classification Search
   CPC .................. G01D 5/24452; G01D 5/34753
   See application file for complete search history.

(56) References Cited

U.S. PATENT DOCUMENTS

| | | |
|---|---|---|
| 4,170,829 A | 10/1979 | Nelle |
| 4,892,416 A | 1/1990 | Hassler, Jr. et al. |
| 5,119,114 A * | 6/1992 | Cary ............ G01D 15/28 346/139 C |
| 6,495,214 B1 | 12/2002 | Prix et al. |
| 8,218,131 B2 | 7/2012 | Otani et al. |

FOREIGN PATENT DOCUMENTS

| | | |
|---|---|---|
| JP | 2001-515744 | 12/2001 |
| JP | 2007-127530 | 5/2007 |
| KR | 10-2009-0056793 | 6/2009 |
| KR | 10-2013-0064172 | 6/2013 |
| WO | 2009/069925 | 6/2009 |

OTHER PUBLICATIONS

Koziumi (JP 2007-127530 A), Nov. 2005, JPO Computer Translation.*
European Search Report, dated Sep. 17, 2015, issued in corresponding European Patent Application No. 15167303.5.

* cited by examiner

*Primary Examiner* — Erika J Villaluna
(74) *Attorney, Agent, or Firm* — Andrews Kurth Kenyon LLP

(57) ABSTRACT

An encoder aligning apparatus includes: a first support member connected to a moveable unit moved along a base; a second support member connected to the first support member through a resilient member, the second support member being provided with an encoder facing a linear scale attached to said base; and an adjustment member penetrating the first support member to contact the second support member for adjusting the distance and the angle between the first support member and the second support member so as to properly align the encoder with the linear scale.

4 Claims, 6 Drawing Sheets

US 9,546,885 B2

ENCODER ALIGNING APPARATUS

CROSS-REFERENCE TO RELATED APPLICATIONS

The present application claims priority to Application No. 10-2014-0062937, filed in the Republic of Korea on May 26, 2014, which is expressly incorporated herein in its entirety by reference thereto.

FIELD OF THE INVENTION

The present invention relates to an encoder aligning apparatus, and more particularly to an encoder aligning apparatus for easily and properly aligning an encoder with a linear scale.

BACKGROUND INFORMATION

An encoder is provided in the stage of an automation system, a semiconductor manufacturing apparatus, a display apparatus manufacturing, etc., so as to be used for measuring the movement position or distance of a transfer unit moving along the base of the stage.

The encoder is connected to a transfer unit so as to move along with the transfer unit. The encoder moves without contacting the base having the linear scale attached thereto to electromagnetically read the linear scale. Thus, the encoder measures the moving position or distance of the transfer unit.

Meanwhile, if the encoder is properly aligned with the linear scale, the measurement by the encoder of the moving position or distance measured is not erroneous because the encoder can properly read the linear scale.

However, if the encoder is not properly aligned with the linear scale, the measurement by the encoder of the moving position or distance measured is erroneous because the encoder cannot properly read the linear scale.

Conventionally, there has been no structure for properly aligning the encoder with the linear scale. Hence, it has been difficult to properly align the encoder with the linear scale, and even realizing the misalignment of the encoder with the linear scale during operation, it is difficult to correct it.

Accordingly, the productivity has been lowered working with the equipment employing the encoder such as the automation system, semiconductor manufacturing apparatus, or display manufacturing apparatus.

SUMMARY

Exemplary embodiments of the present invention are intended to address at least one of the conventional problems as described above.

For example, exemplary embodiments of the present invention are adapted to properly align the encoder with the linear scale.

Additionally, exemplary embodiments of the present invention are adapted to improve the manufacturing productivity and the working efficiency of the equipment employing the encoder.

According to an exemplary embodiment of the present invention, an encoder aligning apparatus includes: a first support member connected to a moveable unit moveable along a base; a second support member connected to the first support member through a resilient member, the second support member being provided with an encoder facing a linear scale attached to said base; and an adjustment member penetrating the first support member to contact the second support member for adjusting the distance and the angle between the first support member and the second support member so as to properly align the encoder with the linear scale.

A plurality of adjustment members and/or resilient members may be provided.

For example, three adjustment members may be provided.

Also, the resilient member may be positioned between adjacent ones of the adjustment members.

In addition, at least some of the adjustment members may be arranged so as to form a right angle with each other.

Also, at least two of the points of the second support member contacting the adjustment members may include a contact groove.

In addition, one of the contact grooves may be shaped like an inverted cone, and the other may be shaped like an inverted quadrangular pyramid.

Further features and aspects of exemplary embodiments of the present invention are described in more detail below with reference to the appended Figures.

DETAILED DESCRIPTION

Figure 1:
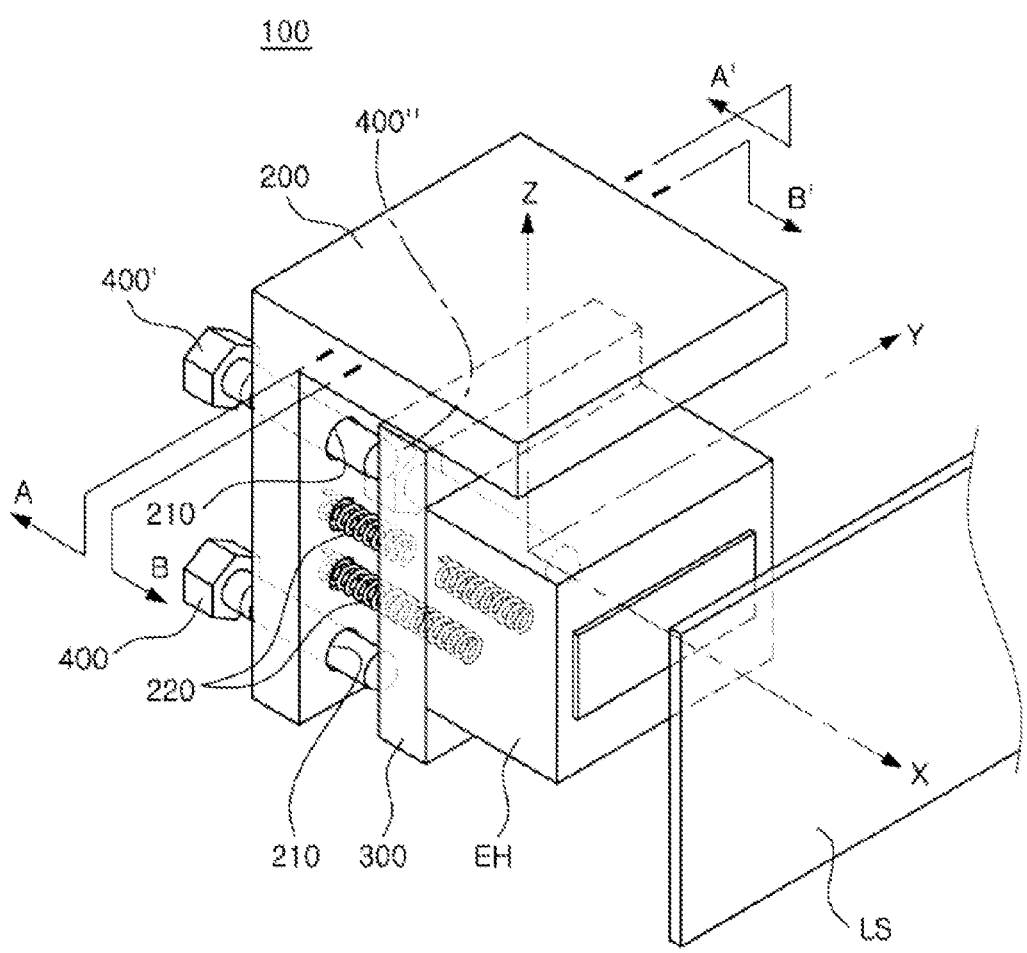
FIG. 1 is a perspective view of an encoder aligning apparatus according to an exemplary embodiment of the present invention.

A more detailed description of an encoder aligning apparatus according to exemplary embodiments of the present invention is provided below. It should be understood that the description is not intended to be limiting and that variations may be made without departing from the spirit and scope hereof. In addition, the appended Figures have the same reference numerals used to represent the parts providing the same or corresponding function in each of the exemplary embodiments.

Figure 2:
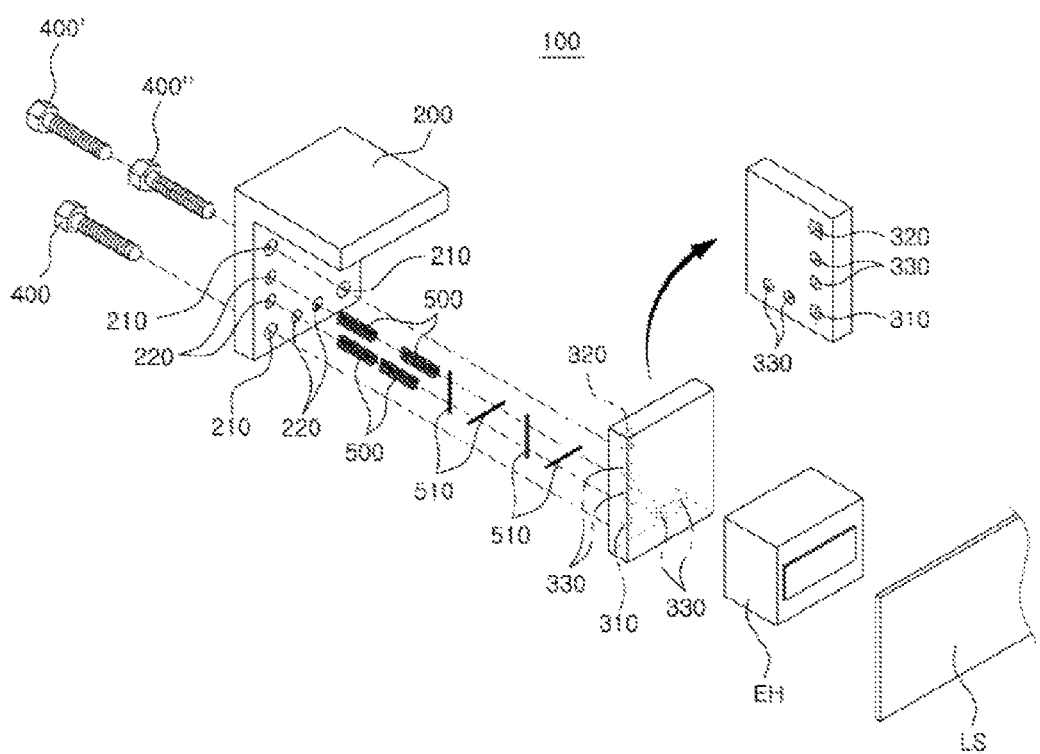
FIG. 2 is an exploded view of an encoder aligning apparatus according to an exemplary embodiment of the present invention.
Figure 3:
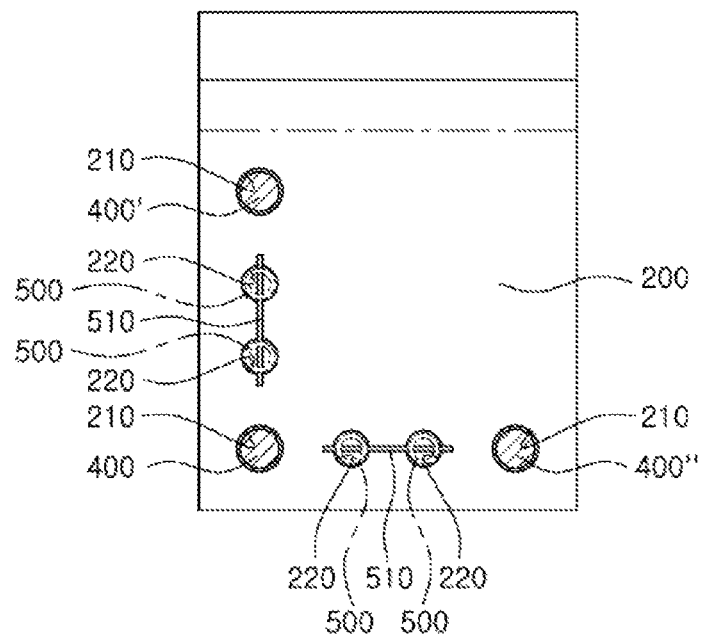
FIG. 3 is a cross-sectional view taken along line A-A' of FIG. 1.
Figure 4:
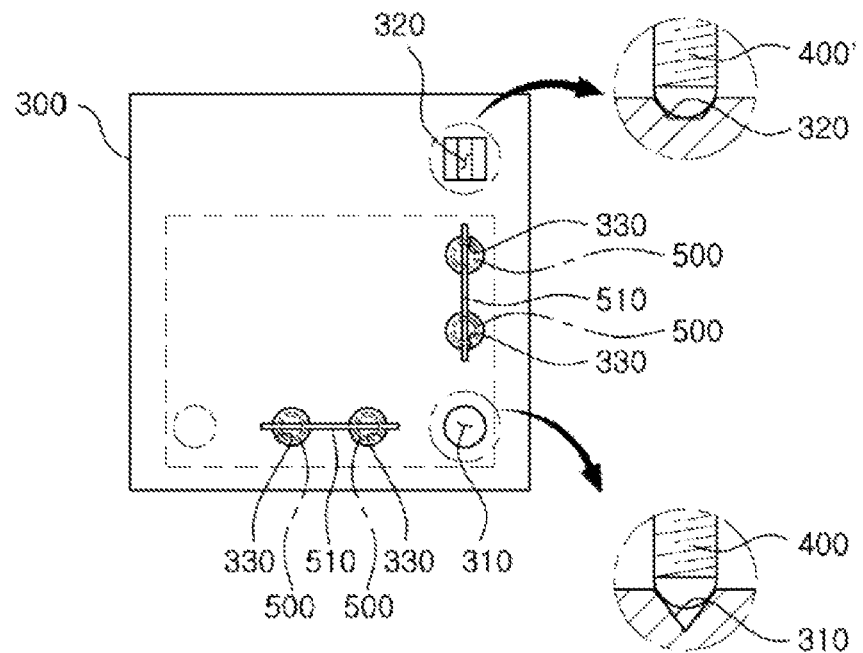
FIG. 4 is a cross-sectional view taken along line B-B' of FIG. 1.
Figure 5:
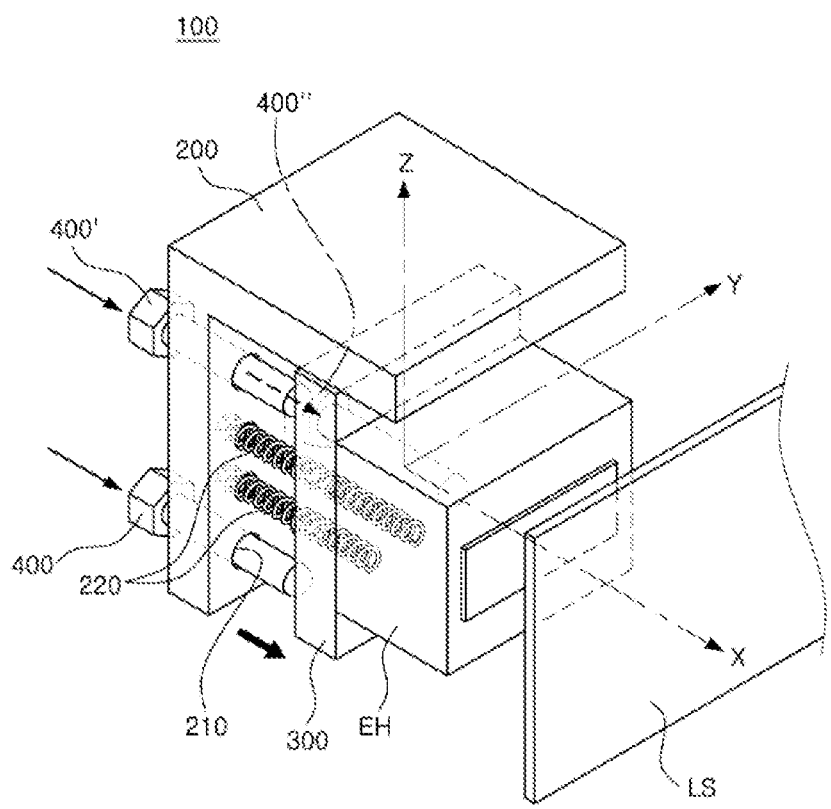
FIGS. 5 to 7 are perspective views for illustrating the operation of an encoder aligning apparatus according to an exemplary embodiment of the present invention.
Figure 6:
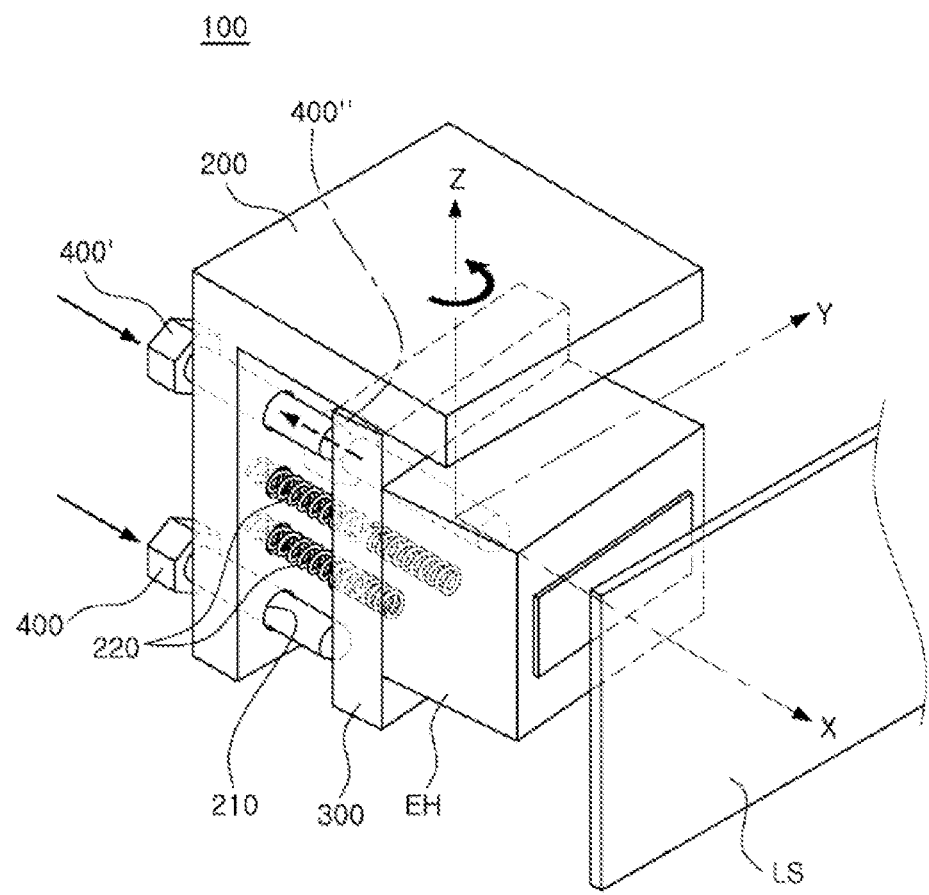
Figure 7:
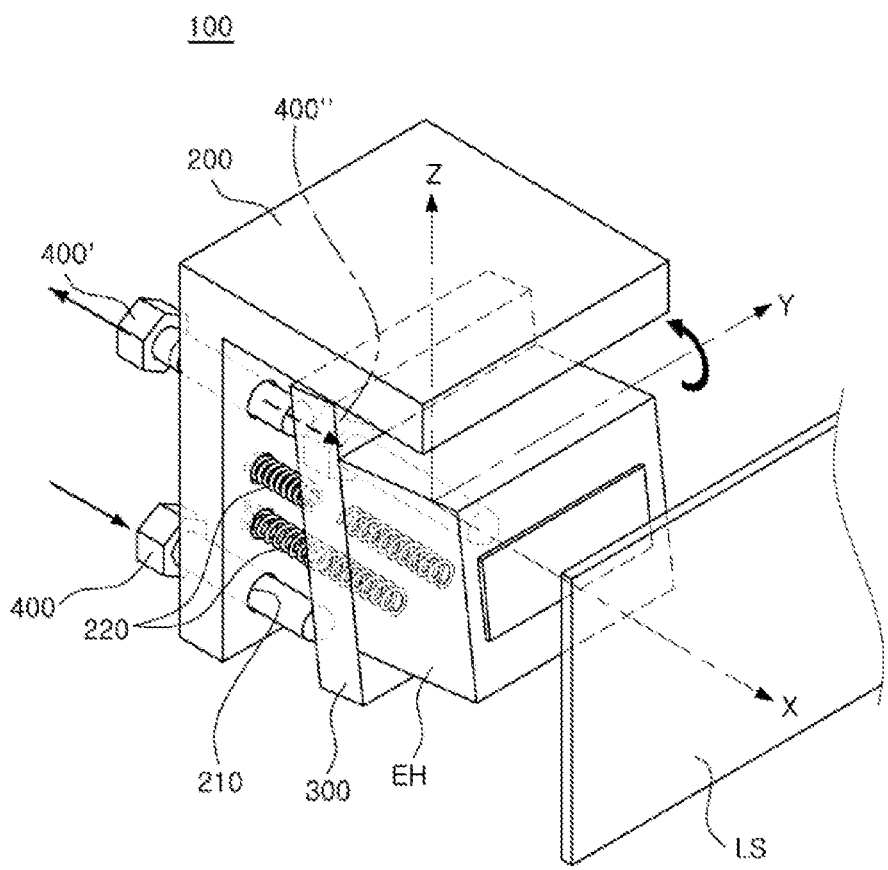

FIG. 1 is a perspective view of an encoder aligning apparatus, and FIG. 2 is an exploded view of an encoder aligning apparatus according to an embodiment of the present invention. FIG. 3 is a cross-sectional view taken along line A-A' of FIG. 1, and FIG. 4 is a cross-sectional view taken along line B-B' of FIG. 1. FIGS. 5 to 7 are perspective views for illustrating the operation of an encoder aligning apparatus.

An encoder aligning apparatus 100 includes, as illustrated in FIGS. 1 and 2, a first support member 200, a second support member 300, and adjustment members 400, 400', 400".

The first support member 200 is connected to a moveable unit that is moveable along a base. Hence, the first support member 200 moves along with the moveable unit.

To this end, as illustrated in FIGS. 1 and 2, the first support member 200 has a cross-section shaped like an inverted L. The vertical part of the first support member 200 is connected to the second support member 300 by a resilient member 500, as described below. Also, the horizontal part of the first support member 200 is connected to the moveable unit.

The first support member 200 may have any shape provided that a part thereof can be connected to the second support member 300, and another part thereof can be connected to the moveable unit.

The moveable unit connected to the first support member 200 and the base along which the moveable unit moves may be included, for example, in an XY stage. The moveable unit and the base may be convention, provided that the moveable unit is moveable along the base.

As illustrated in FIGS. 1 to 3, the first support member 200 is provided with a through-hole 210. As described below, the adjustment members 400, 400', 400" are inserted in the through-hole 210 of the first support member 200.

As described below, the encoder aligning apparatus 100 includes three adjustment members 400, 400', 400', corresponding to which three through-holes 210 are formed in the first support member 200.

However, it should be understood that any number of through-holes 210 formed in the first support member 200 may be provided and may correspond to the number of adjustment members 400, 400', 400".

Also, as illustrated in FIGS. 1 to 3, the first support member 200 is provided with a connection hole 220. The connection hole 220 receives one side of the resilient member 500 for connecting the second support member 300 to the first support member 200.

The encoder aligning apparatus 100 includes four resilient members 500 for connecting the second support member 300 to the first support member 200, and accordingly, as illustrated in FIG. 3, the first support member 200 is provided with four connection holes 220.

However, any number of connection holes 220 formed in the support member 200 may be provided and may correspond to the number of resilient members 500.

Also, any number of resilient members 500 may be provided. For example, four, resilient members may be provided, as described above.

As illustrated in FIG. 3, the connection hole 220 may be formed between the through-holes 210. This is because the resilient member 500 is positioned between the adjustment members 400, 400', 400" in the encoder aligning apparatus 100, as described below.

The connection hole 220 of the first support member 200 for receiving one side of the resilient member 500 is formed between the through-holes 210 of the first support member 200 for passing the adjustment members 400, 400', 400" so as to position the resilient member 500 between adjacent adjustment members 400, 400', 400".

However, the connection hole 220 of the first support member 200 may be located at any position, provided that one side of the resilient member 500 is inserted so as to connect the second support member 300 to the first support member 200.

A fixing member 510 is inserted in the one side of the resilient member 500 inserted in the connection hole 220 of the first support member 200, as illustrated in FIG. 3 and described below. In addition, the fixing member 510 is fixedly attached to the first support member 200. The structure for fixedly attaching the fixing member 510 to the first support member 200 may be, e.g., a ⊏-shaped member, or other structure that provides for the fixing member to be fixedly attached to the support member 200.

Accordingly, the one side of the resilient member 500 inserted in the connection hole 220 of the first support member 200 is prevented from escaping from the connection hole 220.

The second support member 300 is provided with an encoder EH so as to face a linear scale LS provided in the base.

The structure for providing the encoder EH in the second support member 300 may be a conventional structure, such as a connection bracket for connecting the encoder EH to the second support member 300, and may be any structure that allows for the encoder EH to be provided in the second support member 300.

Also, the structure of the encoder EH may be conventional, and the encoder EH may be provided in the second support member 300. In addition, the linear scale LS may be conventional, and the encoder EH provided in the second support member 300 may electromagnetically read the linear scale LS.

The second support member 300 is connected to the first support member 200 by the resilient member 500. To this end, the second support member 300 is provided with a connection hole 330 as the first support member 200.

The connection hole 330 of the second support member 300 receives the other side of the resilient member 500 with one side inserted in the connection hole 220 of the first support member 200. In the present exemplary embodiment, the encoder aligning apparatus 100 includes four resilient members 500 for connecting the second support member 300 to the first support member 200, and accordingly four connection holes 330 are formed in the second support member 300.

Any number of connection holes 330 formed in the second support member 300 may be provided, which may correspond in number with the number of resilient members 500.

The connection hole 330 of the second support member 300 is formed so as to face the connection hole 220 of the first support member 200. In the encoder aligning apparatus 100 of the present exemplary embodiment, because the connection hole 220 of the first support member 200 is formed between the through-holes 210 of the first support member 200, the connection hole 330 of the second support member 300 also is positioned corresponding with the position between the through-holes 210 of the first support member 200.

The connection hole 330 of the second support member 300 may be located in any position, provided that the other side of the resilient member 500 may be inserted so as to connect the second support member 300 to the first support member 200.

The fixing member 510 also can be inserted in the other side of the resilient member 500 inserted in the connection hole 330 of the second support member 300 as in the one side of the resilient member 500 inserted in the connection hole 220 of the first support member 200. Accordingly, the other side of the resilient member 500 inserted in the connection hole 330 of the second support member 300 cannot escape from the connection hole 330 to the outside.

Thus, one side of the resilient member 500 is inserted in the connection hole 220 of the first support member 200, and the other side of the resilient member 500 is inserted in the connection hole 330 of the second support member 300, so that the second support member 300 is connected to the first support member 200 by the fixing member 510 fixing both ends of the resilient member 500.

That is, the second support member 300 may be connected resiliently by the resilient member 500.

Meanwhile, the second support member 300 may also be provided with contact grooves 310, 320. The contact grooves 310, 320 may be formed in at least two of the points of the second support member 300 contacting the adjustment members 400, 400', 400", as described below.

In the present exemplary embodiment, the encoder aligning apparatus 100 includes three adjustment members 400, 400', 400". For example, it includes a first adjustment member 400, a second adjustment member 400', and a third adjustment member 400". In addition, the second support member 300 may be provided with two contact grooves 310, 320. For example, as illustrated in FIG. 4, it has a first contact groove 310 and a second contact groove 320.

In the two contact grooves 310, 320 of the second support member 300, the first contact groove 310 may be positioned corresponding with the position of the first adjustment member 400. Because the first adjustment member 400 is positioned in the center of the three adjustment members 400, 400', 400", the first contact groove 310 is formed at the corresponding position in the second support member 300, as illustrated in FIG. 4.

The first adjustment member 400 penetrates the through-hole 210 of the first support member 200 to contact the first contact groove 310 of the second support member 300.

The contact groove 310 may be shaped like an inverted cone. By this, if the first adjustment member 400 contacts the first contact groove 310, the second support member 300 cannot move in the directions of Y-axis and Z-axis, as shown in FIG. 1, but can move in the direction of X-axis. Also, the second support member 300 cannot turn about X-axis, but can turn about Y-axis and Z-axis.

The second contact groove 320 may be positioned correspondingwith the position of the second adjustment member 400'. For example, because the second adjustment member 400' is positioned at a given distance vertically from the first adjustment member 400, the second contact groove 320 is formed at the corresponding position in the second support member 300.

Also, the second adjustment member 400' penetrates the corresponding through-hole 210 of the first support member 200 to contact the second contact groove 320 of the second support member 300.

The second contact groove 320 may be shaped like an inverted quadrangular pyramid. In addition, the second contact groove 320 is parallel with Z-axis, as illustrated in FIG. 4. Accordingly, if the second adjustment member 400' contacts the second contact groove 320, the second support member 300 cannot move in the direction of Y-axis, as illustrated in FIG. 1, but may move in the directions of X-axis and Z-axis. Also, the second support member 300 cannot turn about X-axis, but may turn about Y-axis and Z-axis.

Thus, if the first adjustment member 400 and the second adjustment member 400' contact the first contact groove 310 and the second contact groove 320 respectively, the second support member 300 cannot move in the directions of Y-axis and Z-axis, but may move in the direction of X-axis. Also, the second support member 300 cannot turn about X-axis, but may turn about Y-axis and Z-axis.

The adjustment member 400, 400', 400" penetrates the first support member 200, e.g., the through-hole 210 of the first support member 200 to contact the second support member 300. By this, it is possible to keep the distance and the angle between the first support member 200 and the second support member 300 connected by the resilient member 500 at a given value.

Also, the adjustment member 400, 400', 400" makes it possible to adjust the distance and the angle between the first support member 200 and the second support member 300, as illustrated in FIGS. 5 to 7.

Thus, it is possible to properly and easily align the encoder EH provided in the second support member 300 with the linear scale LS. This also improves the manufacturing productivity and the working efficiency of the equipment employing the encoder aligning apparatus 100, such as an automation system, a semiconductor manufacturing apparatus, a display manufacturing apparatus, etc.

The adjustment member 400, 400', 400" may be a screw. For example, the adjustment member 400, 400', 400" may be a screw that is turned clockwise to move forward or counterclockwise to move backward.

The adjustment member 400, 400', 400" may be conventional, provided that it can penetrate the first support member 200 to contact the second support member 300 so as to adjust the distance and the angle between the first support member 200 and the second support member 300.

A plurality, e.g., at least three, adjustment members 400, 400', 400" may be provided. Thus, as long as the adjustment members 400, 400', 400" are not aligned in a straight line, the virtual lines joining the ends of the adjustment members 400, 400', 400" form a surface. The first support member 200 which the adjustment members 400, 400', 400" penetrate and the second support member 300 which the adjustment members 400, 400', 400" contact are kept at a given distance and a given angle between them by the adjustment members 400, 400', 400".

At least some of the adjustment members 400, 400', 400" are arranged so as to form a right angle with each other. For example, as illustrated in FIGS. 3 and 4, the adjustment members 400, 400', 400" are the three of the first adjustment member 400, the second adjustment member 400', and the third adjustment member 400". In addition, the first adjustment member 400 is arranged between the second adjustment member 400' and the third adjustment member 400" so as to form a right angle with the second adjustment member 400' and the third adjustment member 400".

Any number and arrangement of adjustment members 400, 400', 400" is possible. At least three may be provided, and at least some of them should be arranged so as to form a right angle with each other.

As illustrated in FIGS. 3 and 4, when the adjustment members 400, 400', 400" are the three of the first adjustment member 400, the second adjustment member 400', and the third adjustment member 400", the first adjustment member 400 penetrates the corresponding through-hole 210 of the first support member 200 to contact the first contact groove 310 of the second support member 300.

Also, the second adjustment member 400' penetrates the corresponding through-hole 210 of the first support member 200 to contact the second contact groove 320 of the second support member 300.

Additionally, the third adjustment member 400" penetrates the corresponding through-hole 210 of the first support member 200 to contact the surface of the second support member 300.

Thus, as described above, the distance and the angle between the first support member 200 and the second support member 300 connected by the resilient member 500 may be kept at a given value.

In this state, as illustrated in FIG. 5, turning the first adjustment member 400, the second adjustment member 400', and the third adjustment member 400" all in a same direction (for example, clockwise or counterclockwise) makes the first adjustment member 400, the second adjustment member 400', and the third adjustment member 400" move in the same direction.

Thus, the second support member 300 may be moved in the direction of X-axis.

Thus, the distance between the first support member 200 and the second support member 300 may be adjusted so as to adjust the distance between the encoder EH provided in the second support member 300 and the linear scale LS.

Also, as illustrated in FIG. 6, if turning the first adjustment member 400 and the second adjustment member 400' in one direction, and the third adjustment member 400" in the other direction, the first adjustment member 400 and the second adjustment member 400' move in the same direction, and the third adjustment member 400" moves in the opposite direction.

Thus, the second support member 300 may be turned about Z-axis, as illustrated in FIG. 6.

Thus, the angle between the first support member 200 and the second support member 300 may be adjusted so as to adjust the angle between the encoder EH provided in the second support member 300 and the linear scale LS.

Also, as illustrated in FIG. 7, if turning the first adjustment member 400 and the third adjustment member 400" in one direction, and the second adjustment member 400' in the other direction, the first adjustment member 400 and the third adjustment member 400" move in the same direction, and the second adjustment member 400' moves in the opposite direction.

Hence, the second support member 300 may be turned about Y-axis, as shown in FIG. 7.

Thus, the angle between the first support member 200 and the second support member 300 may be adjusted so as to adjust the angle between the encoder EH provided in the second support member 300 and the linear scale LS.

Consequently, the first adjustment member 400, the second adjustment member 400', and the third adjustment member 400" make it possible to adjust the distance and the angle between the first support member 200 and the second support member 300 so as to properly and easily align the encoder EH provided in the second support member 300 with the linear scale LS.

Also, the encoder EH may electromagnetically read the linear scale LS without an error.

As described above, the encoder aligning apparatus makes it possible to properly align the encoder with the linear scale, thus improving the manufacturing productivity and the working efficiency of the equipment employing the encoder.

The encoder aligning apparatus as described above is not limited to the foregoing exemplary embodiments, and various modifications and/or combinations may be made without departing from the spirit and scope hereof.

LIST OF REFERENCE CHARACTERS

100 Encoder Aligning Apparatus
200 First Support Member
210 Through-Hole
220, 330 Connection Holes
300 Second Support Member
310 First Contact Groove
320 Second Contact Groove
400 First Adjustment Member
400' Second Adjustment Member
400" Third Adjustment Member
500 Resilient Member
510 Fixing Member
LS Linear Scale
EH Encoder

What is claimed is:

1. An encoder aligning apparatus, comprising:
a first support member connected to a moveable unit moveable along a base;
a second support member connected to the first support member through a resilient member, the second support member being provided with an encoder facing a linear scale attached to the base; and
an adjustment member penetrating the first support member to contact the second support member and adapted to adjust a distance and an angle between the first support member and the second support member so as to properly align the encoder with the linear scale;
wherein the apparatus includes at least three adjustment members;
wherein at least two points of the second support member that contact the adjustment members include a contact groove; and
wherein one of the contact grooves has the shape of an inverted cone, and another one of the contact grooves has the shape of an inverted quadrangular pyramid.

2. The apparatus according to claim 1, wherein the apparatus includes a plurality of adjustment members and a plurality of resilient members.

3. The apparatus according to claim 1, wherein the resilient member is positioned between adjacent adjustment members.

4. The apparatus according to claim 1, wherein at least some of the adjustment members are arranged so as to form a right angle with respect to each other.

* * * * *